(12) United States Patent
Westhoff et al.

(10) Patent No.: US 7,343,489 B2
(45) Date of Patent: Mar. 11, 2008

(54) LOW COST PACKET ORIGINATOR VERIFICATION FOR INTERMEDIATE NODES

(75) Inventors: Dirk Westhoff, Heidelberg (DE); Bernd Lamparter, Heidelberg (DE)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 10/280,061

(22) Filed: Oct. 25, 2002

(65) Prior Publication Data

US 2003/0093687 A1   May 15, 2003

(30) Foreign Application Priority Data

Oct. 25, 2001   (DE) ................ 101 52 056
Mar. 5, 2002    (DE) ................ 102 09 502

(51) Int. Cl.
*H04L 9/00*   (2006.01)
(52) U.S. Cl. .............. 713/168; 380/229; 705/67; 713/156; 713/157; 713/158; 713/159
(58) Field of Classification Search ........... 709/219; 726/4; 370/229
See application file for complete search history.

(56) References Cited

U.S. PATENT DOCUMENTS

| | | | |
|---|---|---|---|
| 6,006,332 A * | 12/1999 | Rabne et al. ............... 726/6 |
| 6,563,826 B1 * | 5/2003 | Shikama .................. 370/394 |
| 6,587,465 B1 * | 7/2003 | Dempo ................... 370/395.1 |
| 6,704,295 B1 * | 3/2004 | Tari et al. ................. 370/270 |
| 6,732,101 B1 * | 5/2004 | Cook ....................... 707/10 |
| 2002/0012433 A1 * | 1/2002 | Haverinen et al .......... 380/247 |
| 2002/0078158 A1 * | 6/2002 | Brown et al. ............. 709/206 |

FOREIGN PATENT DOCUMENTS

| | | |
|---|---|---|
| JP | 4-94232 | 3/1992 |
| JP | 7-202882 | 8/1995 |
| JP | 9-18951 | 1/1997 |
| JP | 2000-59440 | 2/2000 |
| JP | 2002-520923 | 7/2002 |
| WO | WO 02/17553 | 2/2002 |

* cited by examiner

*Primary Examiner*—Kambiz Zand
*Assistant Examiner*—Roderick Tolentino
(74) *Attorney, Agent, or Firm*—Young & Thompson

(57) ABSTRACT

A technique to transmit data from a sender to a receiver via a network, preferably a LAN and/or the Internet etc., where the sender transmits the data to a base station, and where the sender is verified by a server, in particular a AAA-server etc. In order to prevent the transmission of data from an illegitimate sender at the expense of a legitimate sender to the greatest extent possible, the server transmits verification data from the server to the sender and/or base station.

2 Claims, No Drawings

LOW COST PACKET ORIGINATOR VERIFICATION FOR INTERMEDIATE NODES

BACKGROUND OF THE INVENTION

The invention concerns a technique to transmit data from a sender to a receiver via a network, preferably via networks such as a LAN and/or the Internet etc., where the sender transmits data to a base station and where the sender is verified via a server, in particular via servers such as a AAA (Authentication, Authorization, Accounting) server. Such a AAA server is located in the network and is typically used to authenticate a device or user and then to authorize the device or user to access services under defined conditions, following which accounting may be supported.

During the transmission of data, security mechanisms are especially important to protect a legitimate sender from an illegitimate sender. If there are no such protections, an illegitimate sender may pretend to be a legitimate sender, i.e. the illegitimate sender operates using the ID of the legitimate sender, sends data and thus transmits data free of charge to any receiver. The sender could e.g. be a computer that supports data transmission.

In general, a server, often equipped as a AAA server, verifies the sender. The AAA server serves to authenticate the legitimate sender, i.e. to ensure that the sender registers himself and proves that he is the authorized person. The authentication can be done e.g. via a login and/or by entering a password. The AAA server subsequently authorizes that sender to use services to a defined extent, and under well-established conditions.

Once a sender has been authenticated successfully, an illegitimate sender may acquire the identity of the legitimate sender and use the existing connection or even take on the role of the legitimate sender after the connection has been terminated. The illegitimate sender can thus transmit data to any destination free of charge. This is to the disadvantage of the legitimate sender if charging is based on the transmitted data volume and to the disadvantage of the provider in case flat rate charging has been agreed to between the legitimate sender and the provider for data transmission.

SUMMARY OF THE INVENTION

The invention intends to provide a technique as described above, which to a large extent prevents an illegitimate sender from transmitting data at the expense of a legitimate sender.

As required of an invention, the task is solved by a technique for the transmission of data in which the server sends verification data to the sender and/or the base station.

It has been recognized, as required of inventions, that, in addition to the authentication at the server, the sender may be verified unambiguously in a surprisingly simple way. The base station can distinguish between a legitimate sender and an illegitimate sender on the basis of the verification data and, if required, stop the transmission of data. An illegitimate sender can no longer transmit data to an arbitrary receiver at the expense of the legitimate sender.

PREFERRED EMBODIMENT OF THE INVENTION

A very simple instantiation of the invented technique could be to transmit the data via a wireless connection from the sender to the base station. The data could be transmitted via a radio connection, in particular a Bluetooth connection, but also via any other kind of wireless transmission. In this case, the additional verification data to protect against an illegitimate sender is particularly advantageous, because an illegitimate sender is easily able to obtain the identifier, in particular the IP-address, of the legitimate sender from the shared transmission media, even if the transport is protected using IP Sec-IP Security. The illegitimate sender may also be able to obtain the address of the transport layer. In this instantiation, data could be transmitted via the transport layer using MIP—Mobile Internet Protocol.

In case a very secure instantiation of the invented technique is needed, a secure connection could be set up between server and base station and/or between the sender and the server.

Again, to achieve a very secure instantiation, the server could authenticate and/or authorize and/or account the access of the sender to the base station. This could be realized very easily by deploying a AAA-server with the above listed properties.

In a very simple instantiation, the sender and the base station could be in one cell. The sender and the base station could thus setup a direct physical connection; in particular, no relay is envisaged between the sender and the base station. A cell is here defined as the area in which a direct physical connection may be set up between sender and base station.

Again, in view of a very simple instantiation, the server could be in the same domain as the sender and the base station. This would allow a direct authentication of the sender by the server.

Alternatively, the server could also be in a different domain. For authentication purposes, the server could now communicate with another server, in particular with a different AAA-server. For authentication, the sender could accordingly use server located in different domain instead of the local server, where the server located in the different domain authenticates the sender together with the local server.

Again, in view of a very secure instantiation, following a successful authentication by the server, the verification data could be transmitted to the sender. The server could thereby, on the one hand, transmit the verification data to the base station and the sender only after its successful authentication. On the other hand, the server could have already sent the data to the base station, and send a kind of authorization to the base station after successful authentication, following which the base station transmits the verification data to the sender. This guarantees that the verification data is transmitted to the legitimate sender only.

In the framework of another simple instantiation, the server could transmit the verification data via the base station to the sender. The server could also transmit the verification data independently to the base station and the sender.

Again, to achieve a very secure instantiation, the verification data could be encrypted before being transmitted from the server to the base station and/or from the base station to the sender. This encyption can easily be done using a standard public-/private key algorithm. This would allow the verification data to be protected against eavesdropping by an illegitimate third party.

The server could generate and transmit new verification data for each authentication, which would be particularly advantageous. It would thus be impossible for an illegitimate sender to use old verification data to transmit data under a false identity.

The verification data could encompass an initial generating key, where the generating key is transmitted to the sender and the base station. This generating key can then be used to generate the authentication bits. The advantage here is that the transmission of the generating key is much faster because of its small size.

The verification data can additionally or alternatively contain a random bit array $b_1 \ldots b_n$. It could be especially advantageous if the bit array would be one byte, which hardly increases the transport load on scarce resources, such as wireless links. In addition, the bits can be calculated very quickly, which makes the technique very suitable for battery powered devices. Such an instantiation would be especially useful for the wireless transmission of data.

The data intended for transmission could very easily be divided into packets, preferably into IP packets—Internet Protocol packets. This would make it very easy to transmit data via the IP protocol.

The sender could calculate and transmit a proof based on the verification data to the base station. In addition or alternatively, the sender could transmit an index to the base station. This index could be used to mark the packets, where the index would mark the position in the sequence of the packets sent.

The proof for the packet with index i could be calculated using $p_i := b_{(i-1)|p|+1}, \ldots b_{i|p|}$. Hence, each packet has a proof, which makes it possible to detect whether a legitimate sender sent a packet.

Again, the proof could be stateless in a very simple instantiation. This means that older proofs, i.e. $p_1$ to $p_{i-1}$, have no influence on $p_i$. This makes it unnecessary to know previous proofs to be able to calculate $p_i$, which is especially relevant considering that packets loss occurs more frequently on wireless links. Packet loss varies, depending on several parameters, such as the assumed bit error rate on the wireless connection, which is typically between $10^{-3}$ and $10^{-5}$, the error correction mechanism of the medium access layer and the packet length.

The proof and/or the index could be integrated in an additional IP header field or it could be integrated in an extension header when transmitting packets. In case of IPv4—Internet Protocol version 4—an additional IP header filed is used, which contains the proof p and the index i. If IPv6—Internet protocol version 6—were used, the proof and/or the index would be transmitted in an extension header. The transmission of the index in the IP header field or the extension header is necessary to be able to distinguish between packet loss and an attack, as well as to be able to handle a change in the packet sequence. If the sender is connected directly and physically to the base station, a change in the packet sequence can be ruled out. It is usually not necessary for the base station to read and compare the index. After a successful verification, the pointer to the verification data is simply moved |p| positions ahead.

For verification of the sender, the base station could now compare the received proof $p_i$ with a proof $p_{iBS}$ that is calculated from the verification data. If the comparison is negative, it could be an attempted fraud or packet loss.

As a further check, if the proof $p_i$ and proof $p_{iBS}$ calculated by the base station are unequal, the base station could read the index i and recalculate the proof $p_{iBS}$. If the comparison between $p_i$ and $p_{iBS}$ is now positive, packet loss may be assumed.

If this new comparison again yields that the proof $p_i$ is not equal to the proof $p_{iBS}$ as calculated by the base station, the base station could initiate re-authentication. This is because it must now be assumed that an illegitimate sender has sent the packet. To prevent fraud, the base station would now request the sender to re-authenticate itself.

To do so, the server could generate and transmit new verification data. If the sender of the packets is no longer able to identify itself. It is undoubtedly an illegitimate sender and the illegitimate transmission of data is no longer possible. The attack of the illegitimate sender is thus not only detected, but rather also successfully warded off.

The probability that an attacker can successfully send m sequential packets if $\frac{1}{2}^{|p|*m}$. Hence there is obviously a tradeoff between the additionally sent bits and the chances of a successful attack by an illegitimate sender. One proposal for the length of an index and for verification data is thus eight bits. This results in—as mentioned above—one extra byte to be transmitted. We need to further count an additional byte that is sent to the sender during authentication.

With the help of the technique of the invention, it becomes possible to identify IP packets of an authenticate sender not only via the source address, i.e. the IP address of the sender, but also based on a common random value, i.e. the verification data. Such an approach is especially advantageous in that it is not only inexpensive and detects fraud, but in that it also prevents fraud, supports the mapping of IP packets to a sender even if the IP address is changed because of a change of cell, and may be extended to cover a volume-based resource/authentication approach that supports accounting of different access technologies.

Beginning with the initial authentication of the devices, the invention allows the base station to unambiguously identify the originator of each packet that has been transmitted via the wireless connection. The invented technique is particularly advantageous when used for wireless products such as 802.11 or W-CDMA adaptors for mobile devices.

In order to prevent repetitions, we refer to the attached patent claims relevant for other advantageous instantiations of the invented technique.

The invention claimed is:

1. A method for transmitting data from a sender to a base station via a network, comprising the steps of:
   verifying with a server that the sender is an authorized sender; when the sender is an authorized sender, transmitting verification information from the server to the sender and to the base station; transmitting data from the sender to a base station in the network, the data being divided into internet protocol (IP) packets that are each marked with a respective index (i) that marks a position in a sequence in a corresponding packet; generating, for each of the IP packets, a separate respective proof (Pi) used to prove authentication based on both the verification information and the respective index (i); transmitting each respective said proof (Pi) with the respective one of the IP packets; and calculating, for each of the IP packets received at the base station, a separate respective base station proof (PiBs) based on the verification information and on the respective index (i); and comparing the proof (Pi) with the base station proof (PiBs),
   wherein the verification information includes a random bit array b1, . . . bn,
   wherein the proof (Pi) for each of the IP packets is calculated using Pi: =b(i−1)|p|+1, . . . , bi|p|, for the i-th sent packet, where the value |p| denotes the number of each proof's bits.

2. The method according to claim 1, wherein the verification information includes an initial generating key.

* * * * *